United States Patent
Kalmbach et al.

(10) Patent No.: US 11,145,918 B2
(45) Date of Patent: Oct. 12, 2021

(54) BATTERY SYSTEM FOR AN ELECTRIC VEHICLE

(71) Applicant: Mahle International GmbH, Stuttgart (DE)

(72) Inventors: Thomas Kalmbach, Stuttgart (DE); Andre Loges, Leonberg (DE); Heiko Neff, Auenwald (DE)

(73) Assignee: MAHLE INTERNATIONAL GMBH

( * ) Notice: Subject to any disclaimer, the term of this patent is extended or adjusted under 35 U.S.C. 154(b) by 43 days.

(21) Appl. No.: 16/616,375

(22) PCT Filed: May 18, 2018

(86) PCT No.: PCT/EP2018/063178
§ 371 (c)(1),
(2) Date: Nov. 22, 2019

(87) PCT Pub. No.: WO2018/215358
PCT Pub. Date: Nov. 29, 2018

(65) Prior Publication Data
US 2020/0161725 A1  May 21, 2020

(30) Foreign Application Priority Data
May 23, 2017  (DE) .......................... 102017208754.4

(51) Int. Cl.
*H01M 10/625* (2014.01)
*H01M 10/613* (2014.01)
(Continued)

(52) U.S. Cl.
CPC ........... *H01M 10/625* (2015.04); *B60L 50/64* (2019.02); *B60L 58/26* (2019.02);
(Continued)

(58) Field of Classification Search
CPC .. H01M 10/625; H01M 50/20; H01M 10/613; H01M 10/6556; H01M 10/6568;
(Continued)

(56) References Cited

U.S. PATENT DOCUMENTS 9,112,208 B2  8/2015  Kohlberger et al.
9,269,500 B2  2/2016  Meijering et al.
(Continued)

FOREIGN PATENT DOCUMENTS

CN    101609901 A    12/2009
CN    101740841 A    6/2010
(Continued)

OTHER PUBLICATIONS

English abstract for DE-102014200983.
(Continued)

*Primary Examiner* — Gary D Harris
(74) *Attorney, Agent, or Firm* — Fishman Stewart PLLC

(57) ABSTRACT

A battery system for an electric vehicle may include at least one battery module, which may have a plurality of battery cells in a module housing, and a system housing, which may have a separate receiving space for each battery module, which may be delimited by two support walls that run parallel to one another and may be spaced apart from one another, and into which the respective battery module may be inserted. The module housing may have two housing walls, which may run parallel to and may be spaced apart from one another, and which may be each supported in a planar manner with an outer side on an inner side of the respective support wall. The respective support wall may have at least one cooling duct for guiding a coolant, and, on its upper or lower side, screw openings, into which screws may be screwed. The module housing may have screw flanges complementary to the screw openings comprising
(Continued)

through openings, through which the screws may be guided to fix the respective screw flange to the support wall.

20 Claims, 2 Drawing Sheets

(51) Int. Cl.
    *H01M 10/6556*     (2014.01)
    *H01M 10/6568*     (2014.01)
    *B60L 50/64*     (2019.01)
    *B60L 58/26*     (2019.01)
    *H01M 10/0525*     (2010.01)
    *H01M 50/20*     (2021.01)

(52) U.S. Cl.
    CPC ..... *H01M 10/0525* (2013.01); *H01M 10/613* (2015.04); *H01M 10/6556* (2015.04); *H01M 10/6568* (2015.04); *H01M 50/20* (2021.01); *H01M 2220/20* (2013.01)

(58) Field of Classification Search
    CPC ......... H01M 10/0525; H01M 2220/20; H01M 10/6569; B60L 50/64; B60L 58/26; Y02T 10/70; Y02E 60/10
    USPC .......................................................... 429/99
    See application file for complete search history.

(56) References Cited

U.S. PATENT DOCUMENTS

| | | | |
|---|---|---|---|
| 2011/0304297 A1 | 12/2011 | Sohn | |
| 2015/0171492 A1* | 6/2015 | Ramsayer | H01M 10/6554 |
| | | | 429/120 |
| 2016/0344061 A1 | 11/2016 | Maguire et al. | |
| 2017/0012330 A1 | 1/2017 | Kim et al. | |

FOREIGN PATENT DOCUMENTS

| | | |
|---|---|---|
| DE | 10 2008 056859 A1 | 5/2010 |
| DE | 10 2009 040 197 A1 | 3/2011 |
| DE | 102012208239 A1 | 11/2013 |
| DE | 102014200983 A1 | 7/2015 |
| DE | 10 2016 108 926 A1 | 11/2016 |

OTHER PUBLICATIONS

English abstract for CN101609901.
Chinese Office Action dated Aug. 10, 2020 for copending Chinese Appln. No. 201880034053.1 (with English translation).

* cited by examiner

BATTERY SYSTEM FOR AN ELECTRIC VEHICLE

CROSS-REFERENCE TO RELATED APPLICATIONS

This application claims priority to International Patent Application No. PCT/EP2018/063178, filed on May 18, 2018, and German Patent Application No. DE 10 2017 2058 754.4, filed on May 23, 2017, the contents of both of which are hereby incorporated by reference in their entirety.

TECHNICAL FIELD

The present invention relates to a battery system for an electric vehicle as well as to an electric vehicle equipped with such a battery system.

BACKGROUND

Rechargeable batteries, preferably on the basis of lithium-ion, are preferably used in the case of electric vehicles. During the power output, such batteries generate heat and need to thus be cooled. Heat is also generated in response to charging the batteries, in particular when the respective battery is to be charged within a comparatively short time, so-called rapid charging process. In the case of low ambient temperatures, it may furthermore be required to heat the battery for the improved power output. In the case of battery systems, which are used in electric vehicles, there is thus generally the need to provide a cooling or generally a temperature control of the battery.

In the context at hand, an electric vehicle is understood on the one hand to be a vehicle, which has only an electric drive, whereby this vehicle can optionally have an internal combustion engine for power generation, so-called range extender. In the context at hand, electric vehicles are also understood on the other hand to be hybrid vehicles, which have an electric drive as well as a drive by means of internal combustion engine.

A battery system of the type at hand comprises at least one battery module, which has a module housing, in which a plurality of battery cells are arranged. The battery system further comprises a system housing, which has a separate receiving space for each battery module, which is delimited by two support walls that run parallel to one another and are spaced apart from one another, and into which the respective battery module is inserted. Complementary to these support walls, the module housing has two housing walls, which run parallel to one another and which are spaced apart from one another. When the battery module is inserted into the receiving space, an outer side of the respective housing wall abuts in a planar manner on an inner side of the respective support wall. The outer walls of the housing walls face away from the battery cells, which are arranged in the module housing. The inner sides of the support walls face the receiving space.

A battery module is known from DE 10 2014 200 983 A1, in the module housing of which a plurality of battery cells are arranged. A plurality of separating walls in each case run between adjacent battery cells inside the module housing. For the improved cooling of the battery cells, it is proposed to form a cooling duct in the separating walls in each case. The individual battery cells can thus be cooled intensively. The effort for realizing such battery modules is comparatively large.

A battery system is known from DE 10 2012 208 239 A1, which comprises a plurality of battery cells, which are enclosed on three sides by a cooling housing, the walls and bottom of which are permeated with a plurality of cooling ducts. It is further proposed to embody the walls of the cooling housing to be inclined to the bottom. Outer sides of the battery cells, which abut in a planar manner on inner sides of these inclined walls of the cooling housing, are accordingly also embodied to be inclined. For this purpose, the battery cells have to be designed to have a wedge-shaped profile. The effort for realizing such battery cells is comparatively large.

A generic battery system is known from DE 10 2008 056 859 A1. It is characterized in that support walls for delimiting receiving spaces each include cooling ducts so that the support walls serve directly for cooling the battery modules. The heat transfer between the battery modules and support walls can be improved in that at least one of the support walls and the adjoining battery modules have inclined outer walls, so that the force of gravity presses the battery modules laterally against the support wall.

Similar battery systems are also known from DE 10 2016 108 926 A1 and from US 2011/0 304 297 A1.

SUMMARY

The present invention deals with the problem of specifying an improved or at least another embodiment for a battery system of the above-described type or for a vehicle equipped therewith, respectively, which provides for an advantageous cooling for the respective battery module on the one hand and for a cost-efficient producibility on the other hand.

This problem is solved according to the invention by means of the subject matter of the independent claim. Advantageous embodiments are subject matter of the dependent claims.

The invention is based on the general idea of equipping the support walls of the system housing with at least one cooling duct each, through which a coolant can flow. Heat can thus be discharged efficiently from the module housing via the support walls. The integration of such cooling ducts into the support walls does not require any adaptation or change whatsoever of the battery modules and of the battery cells, so that the design according to the invention of the battery system can be realized comparatively cost-efficiently. A cooling circuit for supplying the cooling ducts with coolant can in particular be installed completely outside of the respective battery module, so that for example the assembly and disassembly of the battery module is extremely simplified. A liquid or a two-phase medium, in particular a refrigerant, is preferably used as coolant.

It is hereby furthermore particularly advantageous that crash requirements and crash requirements on the battery system are not impacted thereby, because the cooling ducts in the support walls are typically located outside of a deformation zone.

According to the invention, the respective support wall has, on its upper side or on its lower side, screw openings, into which screws are screwed. The module housing has screw flanges, which are complementary to these screw openings, wherein the above-mentioned screws are screwed through the through openings of the screw flanges, comprising through openings, whereby the respective screw flange is fixed to the support wall. On the respective support wall, the screw openings are located on that side, which faces the battery module in response to the insertion of the battery module. If the battery module is thus inserted into the receiving space from the top, the screw openings are located on the upper side of the respective support wall. If, in contrast, the battery module is inserted into the receiving space from below, the screw openings are located on the lower side of the respective support wall. In the area of the upper side or in the area of the lower side of the module housing, the screw flanges protrude laterally beyond the respective housing wall, thus transversely to the assembly direction and transversely to the longitudinal direction of the respective support wall, so that the respective screw flange bears on the upper side of the respective support wall from the top or on the lower side of the respective support wall from the bottom, respectively, when the module housing is inserted into the receiving space.

For the heat transfer, outer sides of the housing wall are supported in a planar manner on inner sides of the support walls. According to one embodiment, this can take place in such a way that the outer side of the respective housing wall is supported directly on the inner side of the respective support wall and abuts in a planar manner thereon. According to a preferred embodiment, this can alternatively also be realized in such a way that the outer side of the respective housing wall is supported indirectly via a contact element on the inner side of the respective support wall, wherein the contact element abuts in a planar manner on the outer side on the one hand and in a planar manner on the inner side on the other hand. Such a contact element can be comparatively soft and can compensate unevennesses in that way and can thus improve the contacting in a planar manner and thus the heat transfer. The contact element can in particular consist of a thermally conductive material, the coefficient of thermal conductivity of which is in particular higher than that of housing wall and support wall, and which also improves the thermal conductivity between housing wall and support wall.

In the case of an advantageous further development, the respective battery module can be capable of being inserted into the receiving space in an assembly direction, which extends perpendicular to the longitudinal direction of the respective support wall. The assembly of the battery module usually takes place vertically, whereby the battery module is either inserted into the receiving space from the top or into the receiving space from the bottom. A further development is now particularly advantageous, in the case of which in the case of at least one of the support walls, the respective inner side and the outer side of the respective housing wall abutting in a planar manner thereon at an incline to the assembly direction. With the inclined inner side and the outer side, which is inclined complementary thereto, the respective battery module or the module housing thereof, respectively, can be clamped better to the support walls. A contact pressure between the inner sides and outer sides, which abut on one another, can be generated or increased thereby, respectively, which improves the heat transfer between the module housing and the support walls. Said contact pressure is thereby oriented perpendicular to the assembly direction and perpendicular to the longitudinal direction of the preferably straight support walls.

Another further development proposes that at least one such cooling duct in the respective support wall has an elongate cross sectional profile, which runs parallel to the inclined inner side of this support wall. The elongate cross sectional profile can thus in particular be arranged equidistantly to the associated inner side of the support wall, so that a constant or homogenous cooling effect, respectively, can be realized over the entire extension of the cooling duct in a height direction, which runs parallel to the assembly direction. It is clear that in its cross sectional profile, the respective cooling duct can be divided into a plurality of chambers, which run parallel to one another. The chambers can then in particular be flown through in co-current flow (I-flow) or in counter-current flow (U-flow).

Another embodiment proposes that a cooling duct, which serves to cool the respective inner side of the support wall, is arranged eccentrically inside the support wall and offset towards the inner side. A comparatively small distance between cooling duct and inner side can be realized in this way, so that a wall section of the support wall, which separates the inner side from the cooling duct, has a comparatively small wall thickness. As a result, the heat transfer improves between the side wall and the coolant, which is guided in the cooling duct. The wall thickness of the wall section between inner side and cooling duct is, for example, smaller than an opening width of the cooling duct, which is measured parallel to the wall thickness. This wall thickness is in particular maximally half as large as said opening width.

According to another embodiment, the respective support wall can have a mirror-symmetrical cross sectional profile with respect to a longitudinal center plane, so that the support wall has two inner sides, which face away from one another and to which a separate cooling duct is assigned in each case. The respective inner side can be cooled particularly intensively thereby. This embodiment is expedient in particular when the respective support wall separates two receiving spaces from one another, in which a battery module is arranged in each case. The longitudinal center plane thereby runs parallel to the assembly direction, with which the battery module is inserted into the receiving space, as well as parallel to the longitudinal direction of the respective, preferably straight, support wall.

Advantageously, the respective support wall is designed as metal component, which improves the heat transfer into the coolant of the respective cooling duct. An embodiment is particularly cost-efficient, in the case of which the respective support wall is designed as extrusion profile made of metal. Such extrusion profiles can be produced cost-efficiently, whereby the respective cooling duct can be realized particularly easily as chamber or hollow chamber in the interior of the profile body.

An electric vehicle according to the invention is equipped with a battery system of the above-described type. The vehicle furthermore comprises a cooling circuit, in which a coolant circulates. The cooling ducts of the support walls of the battery system are now integrated into the cooling circuit in such a way that the coolant can flow through the cooling ducts. It is clear that the cooling circuit also comprises further conventional components, such as, for example, a coolant pump for driving the coolant, as well as a heat exchanger for transferring the heat discharged via the coolant to the surrounding area or to an air flow for air-conditioning the vehicle interior.

An embodiment is particularly advantageous, in the case of which the respective cooling duct is fluidically separated from the respective receiving space or from the respective battery module. The coolant thus remains external, thus on the outside, with respect to the receiving space and the battery module, so that no internal or external contact with the battery module or with components of the battery module is established. This simplifies the sealing and the corrosion protection of the battery modules, while efficient coolants can simultaneously be used, such as, for example, two-phase refrigerants.

Another embodiment proposes that the respective cooling duct is integrated into a cooling circuit, which is closed with respect to the respective receiving space and with respect to the respective battery module. As a result, the coolant can neither flow through the receiving space nor the battery module, so that a direct contact of the coolant with the battery module or with parts of the battery module is also avoided in this way. A refrigerant, which is preferably a two-phase medium, can thereby also be used as coolant. The cooling circuit is then preferably designed as refrigerant circuit, which is characterized in particular by an evaporator and a condenser as compared to a simple cooling circuit comprising heat exchanger.

Another embodiment proposes that the respective cooling duct is separated along the respective support wall from the respective receiving space and from the respective battery module by the inner side of the support wall. This construction also avoids a supply of the coolant through the cooling duct to the receiving space or to the battery module, respectively.

It can further be provided that the inner side of the respective support wall is designed to be continuous along the respective receiving space. On its inner side, the support wall accordingly does not have an aperture to the receiving space and also no connection for the fluidic coupling with the battery module. In this respect, the inner side is designed to be continuous along the receiving space.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
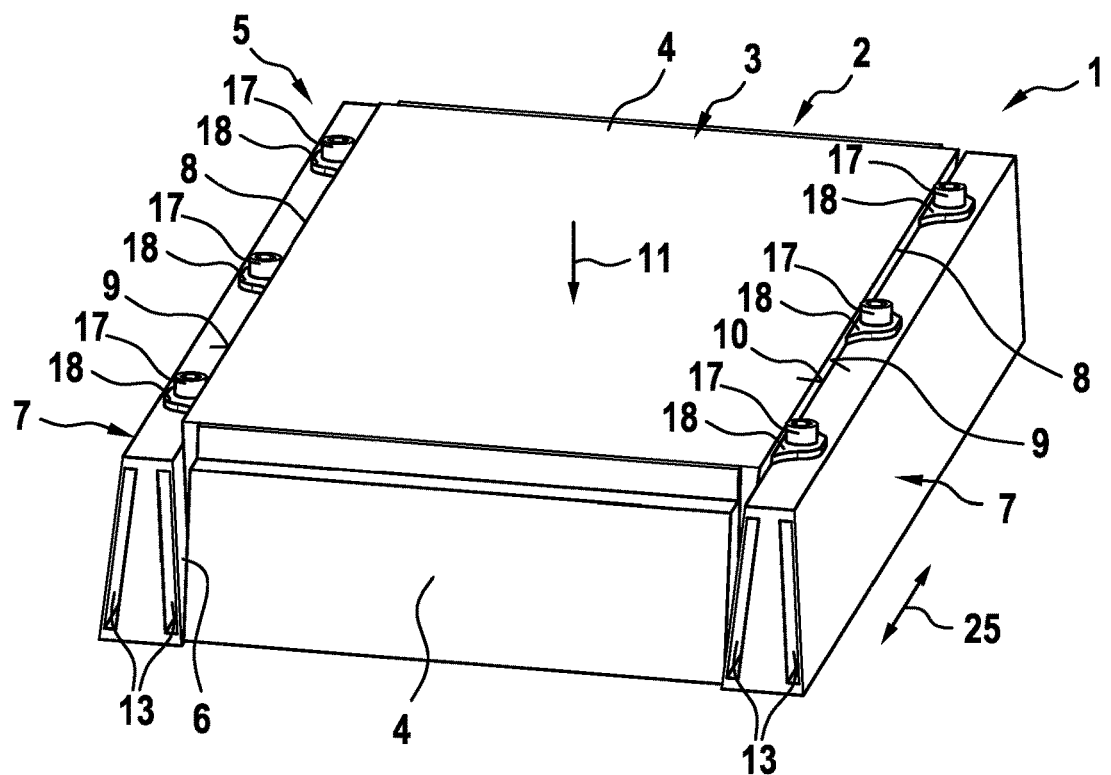
FIG. 1 shows an isometric view of a battery system when the battery module is assembled.

According to FIGS. 1 to 4, a battery system 1 comprises at least one battery module 2, which has a module housing 3, in which a plurality of battery cells 4 are accommodated. The battery system 1 further comprises a system housing 5, which has a separate receiving space 6 for each battery module 2. For this purpose, the system housing 5 has at least two support walls 7, which run parallel to one another and which are spaced apart from one another and which thus laterally delimit the receiving space 6. The respective battery module 2 is inserted into this receiving space 6 with its module housing 3. Only one battery module 2 is illustrated in the example shown here. In the case of other embodiments, a plurality of such battery modules 2 can be arranged next to one another. A plurality of receiving spaces 6, which are arranged next to one another, are then accordingly also present. These receiving spaces 6 are thereby in each case advantageously separated from one another by means of such a support wall 7, so that these support walls 7 then simultaneously in each case laterally delimit two receiving spaces 6. Two further receiving spaces 6, in which a further battery module 2 can in each case be arranged, are accordingly suggested in the cross sections of FIGS. 2 and 4.

The module housing 3 has two housing walls 8, which run parallel to one another and which are spaced apart from one another. In the assembled state, each housing wall 8 faces one of the support walls 7. Each housing wall 8 has an outer side 9 facing the associated support wall 7. The respective support wall 7 in each case has an inner side 10 facing the associated housing wall 8. In the installed state, thus when the battery module 2 is inserted completely into the associated receiving space 6 with its module housing 3, the respective outer side 9 is supported in a planar manner on the respective inner side 10. In the example, a direct contacting is thereby shown, so that the outer side 9 of the respective housing wall 8 is supported directly on the inner side 10 of the respective support wall 7 and abuts in a planar manner thereon. In the case of an embodiment, which is not shown here, it can alternatively be provided that the outer side 9 of the respective housing wall 8 is supported indirectly on the inner side 10 of the respective support wall 7 via a contact element, which is not shown here, so-called interface, wherein the contact element abuts in a planar manner on the outer side 9 on the one hand, and in a planar manner on the inner side 10 on the other hand.

The respective battery module 2 is thereby inserted into the receiving space 6 in an assembly direction 11, which is in each case symbolized in the figures by an arrow 11, which is directed downward. In the example shown here, the battery module 2 is thus inserted into the receiving space 6 from the top. A reverse construction is generally also conceivable, in the case of which the respective battery module 2 is inserted into the receiving space 6 from the bottom. In this, the illustrations of FIGS. 1 to 4 need to be viewed upside down.

It is clear that the system housing 5 can furthermore have at least one bottom, which is not shown here, which delimits the receiving space 6 downward. Alternatively, the bottom can delimit the receiving space 6 upward, quasi as a cover.

The embodiment shown here is particularly advantageous, in the case of which in the case of the support walls 7 the respective inner side 10 and the outer side 9 of the respective housing wall 8 abutting in a planar manner thereon run at an incline to the assembly direction. A corresponding angle of inclination 12 is suggested in FIG. 2. The angle of inclination 12 comparatively small and can be, for example, 5°. The angle of inclination 12 can generally be selected arbitrarily. Particularly suitable angles of inclination 12 preferably lie in a range of between 3° and 30°. The inclination is thereby oriented in such a way that the support walls converge in the assembly direction 11 on their inner sides 10. By indenting the module housing 3 in the assembly direction 11, a pressing, which runs transversely to the assembly direction 11 and transversely to the longitudinal direction of the support wall 7, of the outer sides 9 against the inner sides 10 then takes place.

Figure 3:
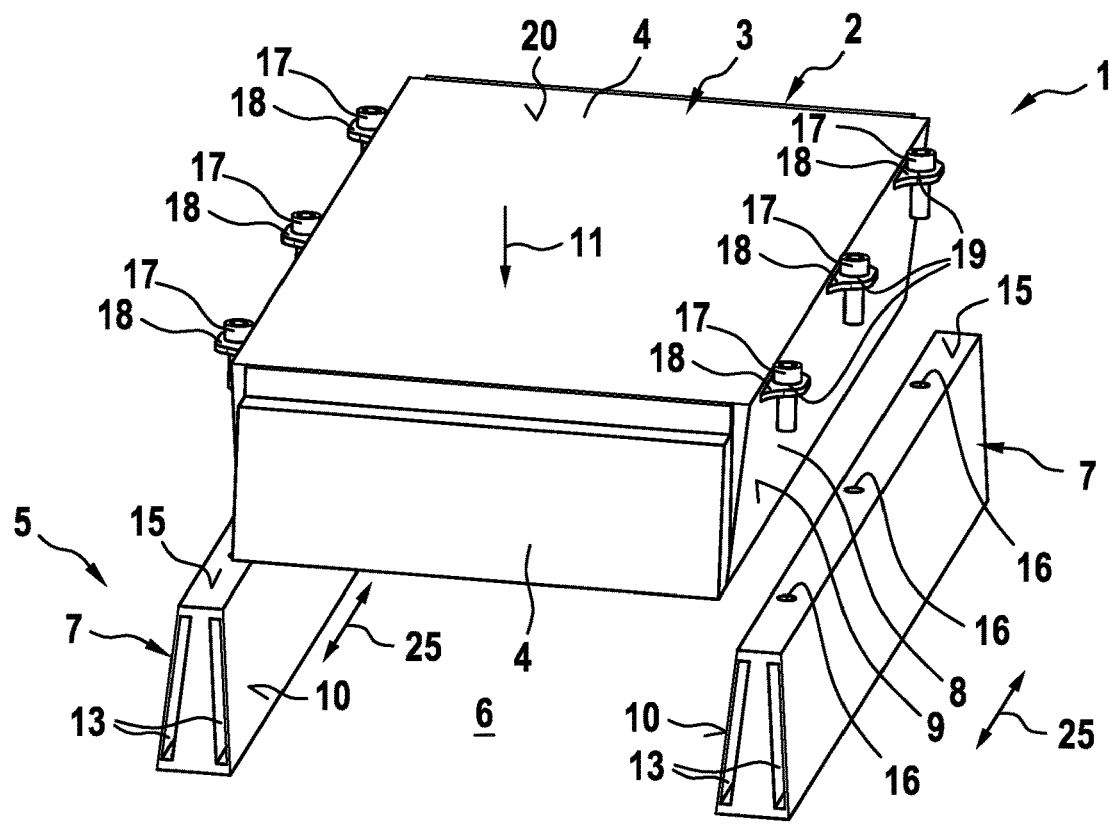
FIG. 3 shows an isometric view of the battery system during the assembly of the battery module.
Figure 4:
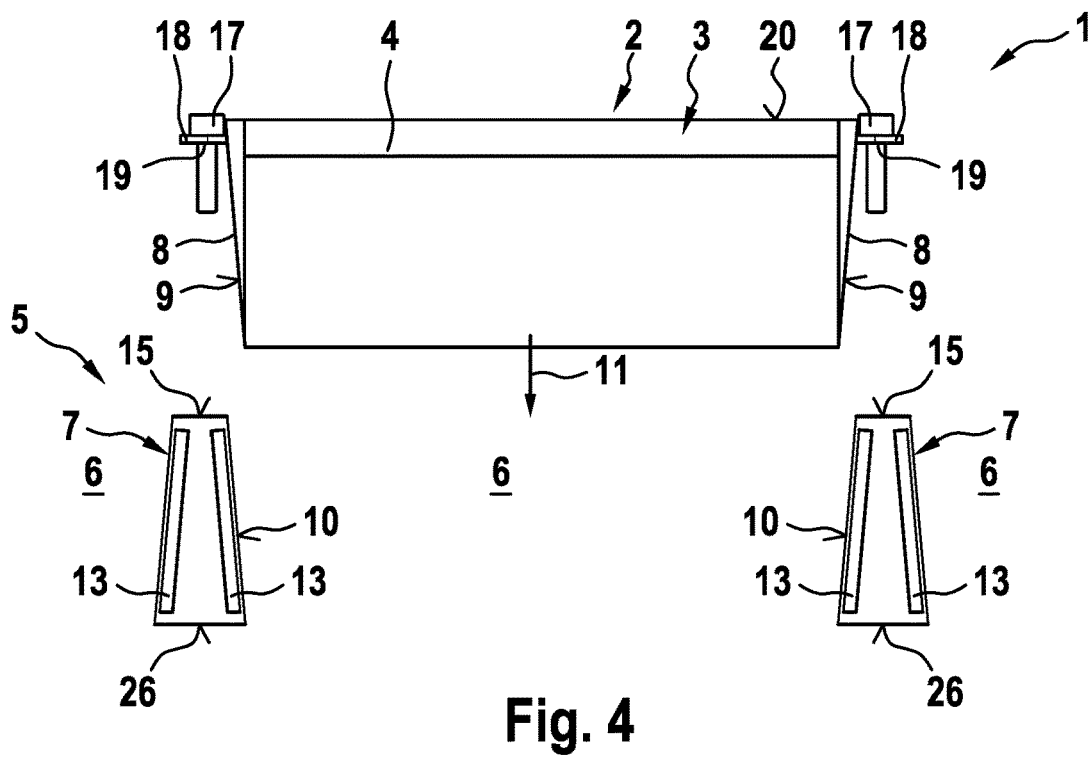
FIG. 4 shows a cross section of the battery system during the assembly of the battery module.

In FIGS. 1 and 3, the longitudinal direction of the respective support wall 7 is suggested by a double arrow and is identified with 25.

In the case of the battery system 1 presented here, the support walls 7 are each equipped with at least one cooling duct 13, which serves to guide a coolant. Each support wall 7, which separates two receiving spaces 6 from one another, preferably includes two separate cooling ducts 13. Inside the respective support wall 7, the cooling ducts 13 are preferably equipped with an elongate cross sectional profile, which is designed to be rectangular or in a parallelogram-like manner here. The longitudinal direction of the respective cross sectional profile runs transversely to the longitudinal direction 25 of the respective support wall 7 and thereby lies in the sectional planes of FIGS. 2 and 4 and thus in the drawing plane. This elongate cross sectional profile is advantageously not oriented parallel to the assembly direction 11, but at an incline thereto. The inclination of the elongate cross sectional profile advantageously takes place analogous to the inclination of the respective inner side 10, which is assigned to the respective cooling duct 13 inside the support wall 7, thus also with the angle of inclination 12. The elongate cross sectional profile thus runs parallel to the inclined inner side 10, which is arranged proximally to the respective cooling duct 13. It can further be seen that the respective cooling duct 13 is arranged comparatively close to the respective inner side 10, which is to be cooled. For this purpose, the respective cooling duct 13 inside the support wall 7 is arranged eccentrically and offset towards the respective inner side 10.

Figure 2:
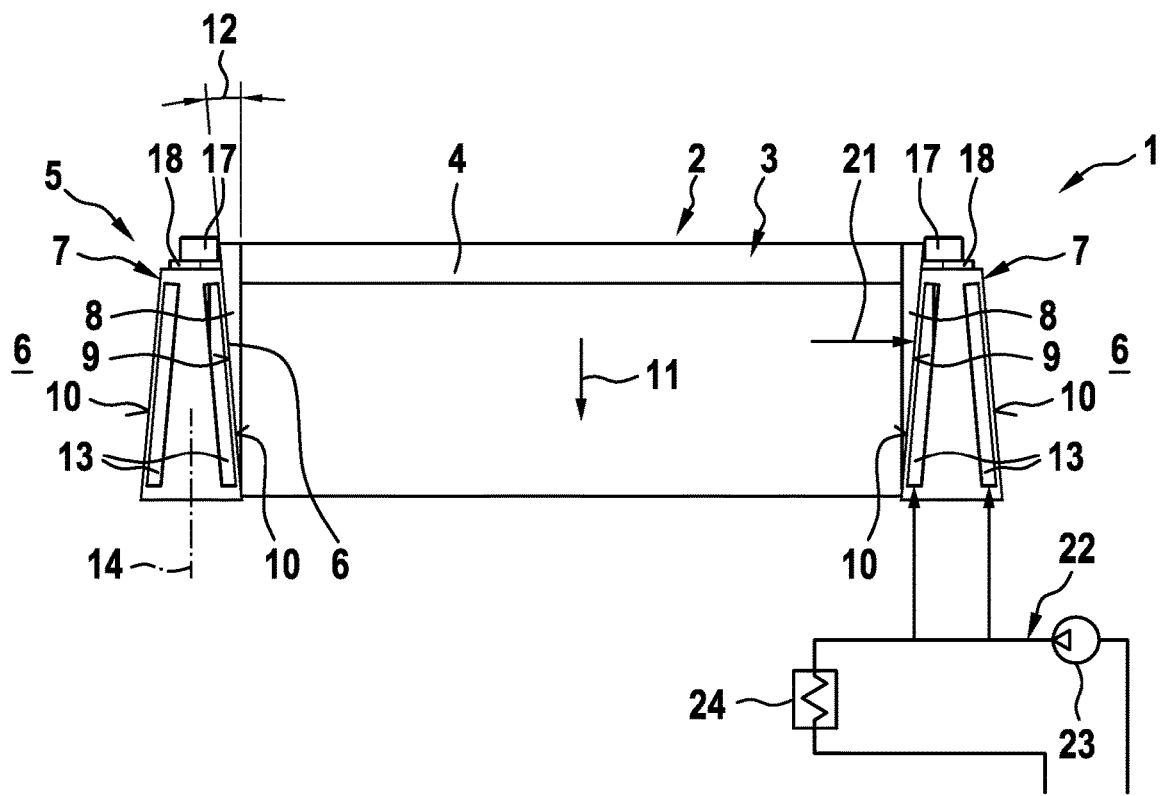
FIG. 2 shows a cross section of the battery system when the battery module is assembled.

In the examples shown here, the support walls 7 are designed mirror-symmetrically with respect to a longitudinal center plane 14, which is marked in an exemplary manner for the left support wall 7 in FIG. 2. This longitudinal center plane 14 thereby runs parallel to the assembly direction 11 and parallel to the longitudinal direction 25 of the respective support wall 7. The respective support wall 7 thus has a mirror-symmetrical cross sectional profile with respect to the longitudinal center plane 14.

Two inner sides 10 facing away from one another as well as two separate cooling ducts 13, which are each assigned to an inner side 10, are then accordingly provided on the respective support wall 7.

As can in particular be gathered from FIG. 3, on its upper side 15, the respective support wall 7 can have a plurality of screw openings 16, into which screws 17 can be screwed. A plurality of screw flanges 18, which each have a through opening 19, into which the respective screw 17 is inserted, are embodied on the module housing 3. The respective screw flange 18 projects laterally, thus transversely to the assembly direction 11, from the respective housing wall 8, namely in the area of an upper side 20 of the module housing 3. When assembling or inserting the battery module 2, respectively, into the receiving space 6, the screw flanges 18 abut on the upper side 15 of the respective support wall 7 in such a way that the respective through opening 19 is aligned with the respective screw opening 16. As a result, the respective screw 17 can be screwed into the screw opening 16, so as to fix the respective screw flange 18 and thus the entire module housing 3 to the support walls 7 in this way. For this purpose, the screw flanges 18 are advantageously positioned on the module housing 3 in such a way that a tensioning of the module housing 3 in the assembly direction 11 results due to the screw connections. This tensioning is transferred via the inclined outer sides 9 and inner sides 10 to the support walls 7 in such a way that the outer sides 10 abut on the inner sides 9 transversely to the assembly direction 11 and transversely to the longitudinal direction of the support walls 7 under bias. This bias is suggested in an exemplary manner in FIG. 2 by means of an arrow and is identified with 21.

The support walls 7 can advantageously be produced as extrusion profiles. A metal or a metal alloy, respectively, is hereby particularly suitable as material. Light metals or light alloys, respectively, are preferably used thereby.

Alternatively, it is generally also possible to not assemble the battery module 2 from the top, as in the present case, but from the bottom. In this case, the screw openings 16 are then located on the respective lower side 26 of the respective support wall 7. It is clear that the inclinations of the outer sides 9 and of the inner side 10 are then also reversed, in order to again create the receiving space 6, which converges in the insertion direction or assembly direction 11, respectively.

A vehicle, which is not illustrated in more detail, which is equipped with such a battery system 1, further comprises a cooling circuit 22, which is only partially suggested in FIG. 2, in which a coolant circulates and into which the cooling ducts 13 are integrated. The cooling circuit 22 further comprises a coolant pump 23 as well as a heat exchanger 24 for discharging the heat. In the case of another embodiment, the cooling circuit 22 can be designed as refrigerant circuit. The heat exchanger 24 is then a condenser, while the cooling ducts 13 of the support walls 7 serve as evaporator. The coolant is then preferably a two-phase refrigerant. Depending on the configuration, the cooling circuit can also be perceived as part of the battery system 1, for example when it is present in addition to a vehicle-side cooling circuit.

In the case of the embodiments shown here, the respective cooling duct 7 is fluidically separated from the respective receiving space 6 and from the respective battery module 2. The coolant thus remains external, thus outside, with respect to the receiving space 6 and the battery module, so that no internal or external contact is established with the battery module 2 or with components of the battery module 2. It is further provided that the respective cooling duct 13 is integrated into said cooling circuit 22, which is closed with respect to the respective receiving space 6 and with respect to the respective battery module 2. As a result, the coolant can neither flow through the receiving space 6 nor through the battery module 2, so that a direct contact of the coolant with the battery module 2 or with parts of the battery module 2 is also avoided in this way. The respective cooling duct 13 is furthermore separated here from the respective receiving space 6 and from the respective battery module 2 along the respective support wall 7 by the inner side 10 of the support wall 7. For this purpose, the inner side 10 of the respective support wall 7 is designed to be continuous or continuous throughout, respectively, along the respective receiving space 6. On its inner side 10, the support wall 7 thus does not have an aperture to the receiving space 6 and also no connection for the fluidic coupling with the battery module 2.

The invention claimed is:

1. A battery system for an electric vehicle, comprising:
at least one battery module, which has a plurality of battery cells in a module housing;
a system housing, which has a separate receiving space for each battery module, which is delimited by two support walls that run parallel to one another and are spaced apart from one another, and into which the respective battery module is inserted;
wherein the module housing has two housing walls, which run parallel to one another and which are spaced apart from one another, and which are each supported in a planar manner with an outer side on an inner side of the respective support wall;
wherein the respective support wall has at least one cooling duct for guiding a coolant;

wherein the respective support wall has, on its upper side or on its lower side, screw openings, into which screws are screwed; and wherein the module housing has screw flanges, which are complementary to the screw openings, comprising through openings, through which the screws are guided, in order to fix the respective screw flange to the support wall.

2. The battery system according to claim 1, wherein the outer side of the respective housing wall is supported directly on the inner side of the respective support wall and abuts in a planar manner thereon.

3. The battery system according to claim 1, wherein the outer side of the respective housing wall is supported indirectly via a contact element on the inner side of the respective support wall, wherein the contact element abuts in a planar manner on the outer side and in a planar manner on the inner side.

4. The battery system according to claim 1, wherein:
each battery module is inserted into the respective receiving space in an assembly direction, which extends perpendicular to a longitudinal direction of the respective support wall; and
in the case of at least one of the support walls perpendicular to the longitudinal direction, the inner side and the outer side of the respective housing wall abutting in a planar manner thereon run at an incline to the assembly direction.

5. The battery system according to claim 4, wherein the at least one cooling duct in the respective support wall has an elongate cross-sectional profile, which runs parallel to the inclined inner side of the respective support wall.

6. The battery system according to claim 1, wherein the at least one cooling duct, which serves to cool the inner side of the respective support wall, is arranged eccentrically inside the respective support wall and offset towards the inner side.

7. The battery system according to claim 1, wherein the respective support wall has a mirror-symmetrical cross-sectional profile with respect to a longitudinal center plane, which runs parallel to an assembly direction extending perpendicular to a longitudinal direction of the respective support wall, with which the battery module is inserted into the receiving space, so that the respective support wall has two inner sides, which face away from one another and to which separate cooling ducts are assigned.

8. The battery system according to claim 1, wherein the respective support wall is designed as an extrusion profile made of metal.

9. The battery system according to claim 1, wherein the at least one cooling duct is fluidically separated from the respective receiving space and from the respective battery module.

10. The battery system according to claim 1, wherein the at least one cooling duct is integrated into a cooling circuit, which is closed with respect to the respective receiving space and with respect to the respective battery module.

11. The battery system according to claim 1, wherein the at least one cooling duct is separated along the respective support wall from the respective receiving space and from the respective battery module by the inner side of the respective support wall.

12. The battery system according to claim 1, wherein the inner side of the respective support wall is designed to be continuous along the respective receiving space.

13. An electric vehicle, comprising:
a battery system; and
a cooling circuit in which a coolant circulates;
wherein the battery system includes:
at least one battery module, which has a plurality of battery cells in a module housing; and
a system housing, which has a separate receiving space for each battery module, which is delimited by two support walls that run parallel to one another and are spaced apart from one another, and into which the respective battery module is inserted;
wherein the module housing has two housing walls, which run parallel to one another and which are spaced apart from one another, and which are each supported in a planar manner with an outer side on an inner side of the respective support wall;
wherein the respective support wall has at least one cooling duct for guiding a coolant;
wherein the respective support wall has, on its upper side or on its lower side, screw openings, into which screws are screwed;
wherein the module housing has screw flanges, which are complementary to the screw openings, comprising through openings, through which the screws are guided, in order to fix the respective screw flange to the support wall; and
wherein the cooling ducts of the support walls are integrated into the cooling circuit so that the coolant is flowable through the cooling ducts.

14. The electric vehicle according to claim 13, wherein the coolant is a liquid or a two-phase medium.

15. The electric vehicle according to claim 13, wherein the outer side of the respective housing wall is supported directly on the inner side of the respective support wall and abuts in a planar manner thereon.

16. The electric vehicle according to claim 13, wherein the outer side of the respective housing wall is supported indirectly via a contact element on the inner side of the respective support wall, wherein the contact element abuts in a planar manner on the outer side and in a planar manner on the inner side.

17. The electric vehicle according to claim 13, wherein:
each battery module is inserted into the respective receiving space in an assembly direction, which extends perpendicular to a longitudinal direction of the respective support wall; and
in the case of at least one of the support walls perpendicular to the longitudinal direction, the inner side and the outer side of the respective housing wall abutting in a planar manner thereon run at an incline to the assembly direction.

18. The electric vehicle according to claim 17, wherein the at least one cooling duct in the respective support wall has an elongate cross-sectional profile, which runs parallel to the inclined inner side of the respective support wall.

19. A battery system for an electric vehicle, comprising:
at least one battery module, which has a plurality of battery cells in a module housing;
a system housing, which has a separate receiving space for each battery module, which is delimited by two support walls that run parallel to one another and are spaced apart from one another, and into which the respective battery module is inserted;
wherein the module housing has two housing walls, which run parallel to one another and which are spaced apart from one another, and which are each supported in a planar manner with an outer side on an inner side of the respective support wall;
wherein the respective support wall has at least one cooling duct for guiding a coolant;

wherein the respective support wall has, on its upper side or on its lower side, screw openings, into which screws are screwed;

wherein the module housing has screw flanges, which are complementary to the screw openings, comprising through openings, through which the screws are guided, in order to fix the respective screw flange to the support wall;

wherein the at least one cooling duct, which serves to cool the inner side of the respective support wall, is arranged eccentrically inside the respective support wall and offset towards the inner side; and wherein the at least one cooling duct is fluidically separated from the respective receiving space and from the respective battery module.

20. An electric vehicle, comprising at least one battery system according to claim 1.

\* \* \* \* \*